United States Patent

[11] 3,588,718

[72] Inventor Mitsuo Oiso
Kawasaki-shi, Japan
[21] Appl. No. 1,620
[22] Filed Jan. 9, 1970
[45] Patented June 28, 1971
[73] Assignee Fujitsu Limited
Kawasaki, Japan
[32] Priority Nov. 9, 1965
[33] Japan
[31] 40-68617
Continuation-in-part of application Ser. No. 592,181, Nov. 4, 1966.

[54] DISCRIMINATOR CIRCUIT FOR SEPARATING BINARY DATA SIGNALS AND CLOCK SIGNALS FROM A MODULATED BINARY DATA SIGNAL

8 Claims, 7 Drawing Figs.

[52] U.S. Cl. .......... 329/104, 307/271, 325/42, 328/109, 328/140, 329/106, 329/122
[51] Int. Cl. .......... H03k 9/04
[50] Field of Search .......... 329/104, 106, 107, 122—125, 150; 328/140, 109, 110, 63; 307/234, 271; 325/41, 42, 346

[56] References Cited
UNITED STATES PATENTS
3,368,152 2/1968 Jorgensen .......... 328/140

*Primary Examiner*—Alfred L. Brody
*Attorneys*—Curt M. Avery, Arthur E. Wilfond, Herbert L. Lerner and Daniel J. Tick

ABSTRACT: A peak detector derives peak pulses separated by time intervals subject to variation from a modulated binary data signal. Binary data signals are detected and separated from the modulated binary data signal. Clock signals are detected and separated from the modulated binary data signal. A control operated by the peak pulses controls the operation of each of the data and clock deriving circuits and comprises a time varying circuit for varying the time position of the clock signals to overcome variations in the time intervals between the peak pulses.

PEAK DETECTOR

MONOSTABLE MULTIVIBRATOR

BISTABLE MULTIVIBRATOR

DISCRIMINATOR CIRCUIT FOR SEPARATING BINARY DATA SIGNALS AND CLOCK SIGNALS FROM A MODULATED BINARY DATA SIGNAL

DESCRIPTION OF THE INVENTION

The present application is a continuation-in-part of copending U.S. Pat. application Ser. No. 592,181, filed Nov. 4, 1966, for Discriminator Circuit For Separating Binary Data Signals And Clock Signals From A Modulated Binary Data Signal, and assigned to the assignee of the present application.

The present invention relates to a discriminator circuit. More particularly, the invention relates to a discriminator circuit for recorded modulated binary data signals.

In a data processing system, a magnetic tape, disc or drum storage is utilized for frequency or phase-modulated binary data signals. The stored binary data signals are read out from the storage. The discriminator circuit of the present invention derives the data signals from the signals read out from the storage. The time positions of the readout data signals may be determined by the clock of the data signal itself of each bit. Thus, the clock and the data of each readout modulated binary data signal are separated and indicated.

In frequency or phase-modulated binary data signals of the aforedescribed type, the positions of the clock signals and the spaces between the clock signals may become unstable in time. Furthermore, it may be difficult to clearly separate the clock and data signals from each other. It is thus necessary to derive the data signals without error, although they are detected by clock signals which vary in time position. It is also necessary to clearly separate the data signals and the clock signals from each other.

The principal object of the present invention is to provide a new and improved discriminator circuit, especially for recorded modulated binary data signals. The discriminator circuit of the present invention has great stability in operation and great stability and clarity in the separation of the clock signals and the data signals and the data signals in operation. The discriminator circuit of the present invention is especially useful in readout of binary data signals from a storage of a data processing system. The discriminator circuit of the present invention functions with efficiency, effectiveness and reliability and is of simple structure.

In accordance with the present invention, a discriminator circuit for detecting and separating binary data signals and clock signals from a modulated binary data signal comprises a peak detector for deriving peak pulses from the modulated binary data signal. The peak pulses are separated by time intervals subject to variation. Data deriving means detects and separates binary data signals from the modulated binary data signal. Clock deriving means detects and separates clock signals from the modulated binary data signal. Control means is connected between the peak detector means and each of the data deriving means and the clock deriving means and is operable by the peak pulses derived by the peak detector means to control the operation of each of the data deriving and clock deriving means. The control means comprises time varying means for varying the time positions of the clock signals to overcome variations in the time intervals between the peak pulses.

The data deriving means is connected to the control means for varying the time positions of the clock signals in accordance with the nature of the binary data of the binary data signals. The control means comprises a monostable multivibrator having an operating time during its period of astable operation and time varying means for varying the operating time thereof to vary the time positions of the clock signals in accordance with the nature of the binary data of the binary data signals. In a preferred embodiment of the invention, the time varying means of the monostable multivibrator shortens the operating time thereof when a determined binary value is indicated in the data deriving means.

In accordance with the present invention, a method of detecting and separating binary data signals and clock signals from a modulated binary data signal comprises the steps of deriving peak pulses from the modulated binary data signal, the peak pulses being separated by time intervals subject to variation; detecting and separating binary data signals from the modulated binary data signal; detecting and separating clock signals from the modulated binary data signal; and controlling the detecting and separating of each of the binary data signals and clock signals to vary the time positions of the clock signals to overcome variations in the time intervals between the peak pulses. The time positions of said clock signals are varied in accordance with the nature of the binary data of the binary data signals.

In order that the present invention may be readily carried into effect, it will now be described with reference to the accompanying drawings, wherein.

Figure 1:
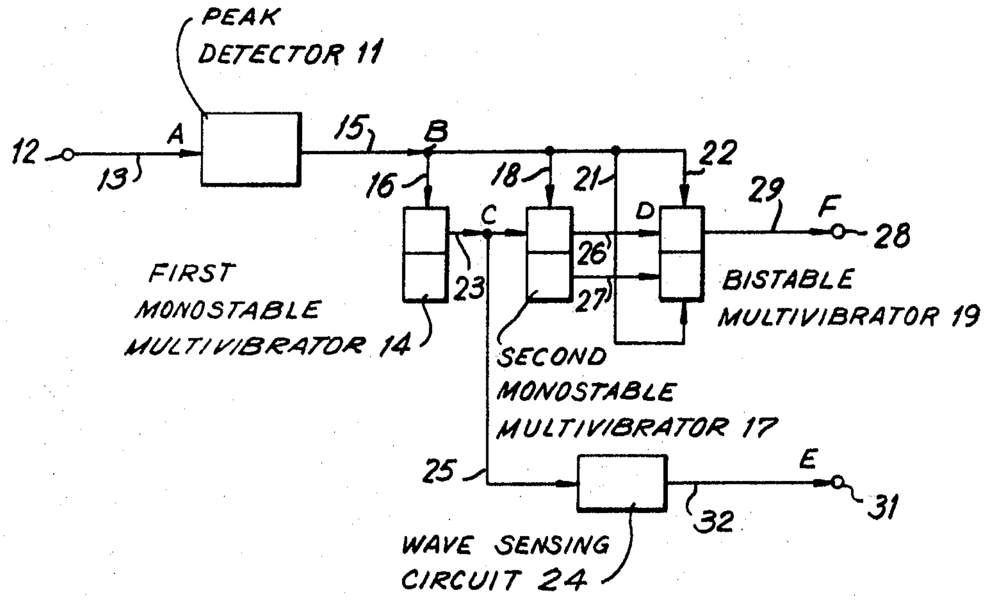
FIG. 1 is a block diagram of an embodiment of the discriminator circuit of the present invention.
Figure 3:
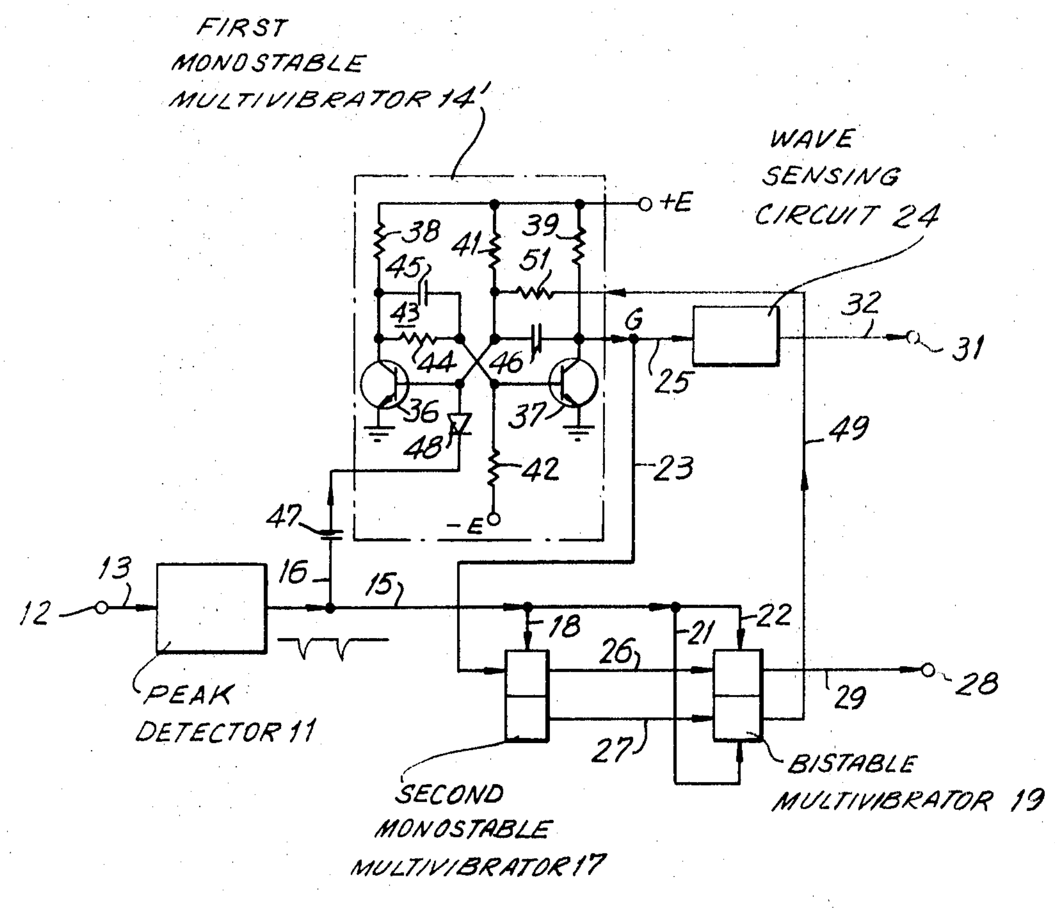
FIG. 3 is a block and circuit diagram of the embodiment of the discriminator circuit of FIG. 1.
Figure 6:
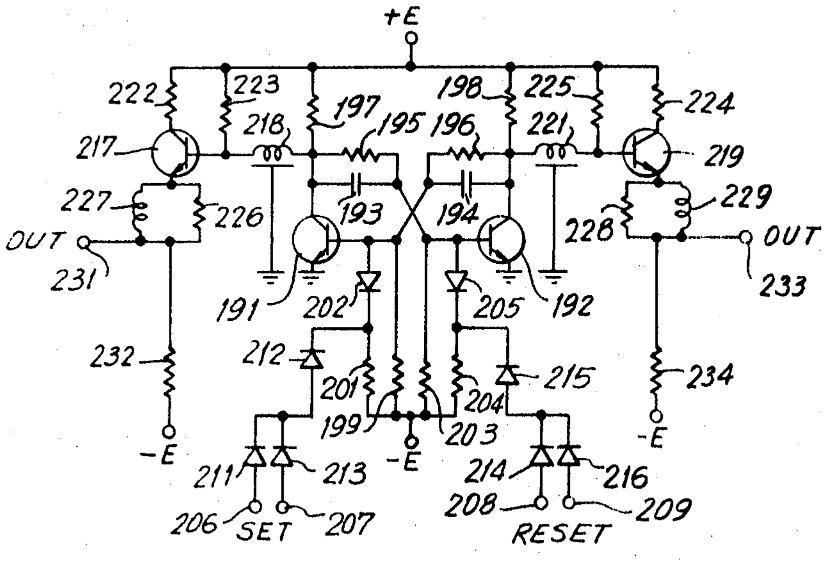
Figure 7:
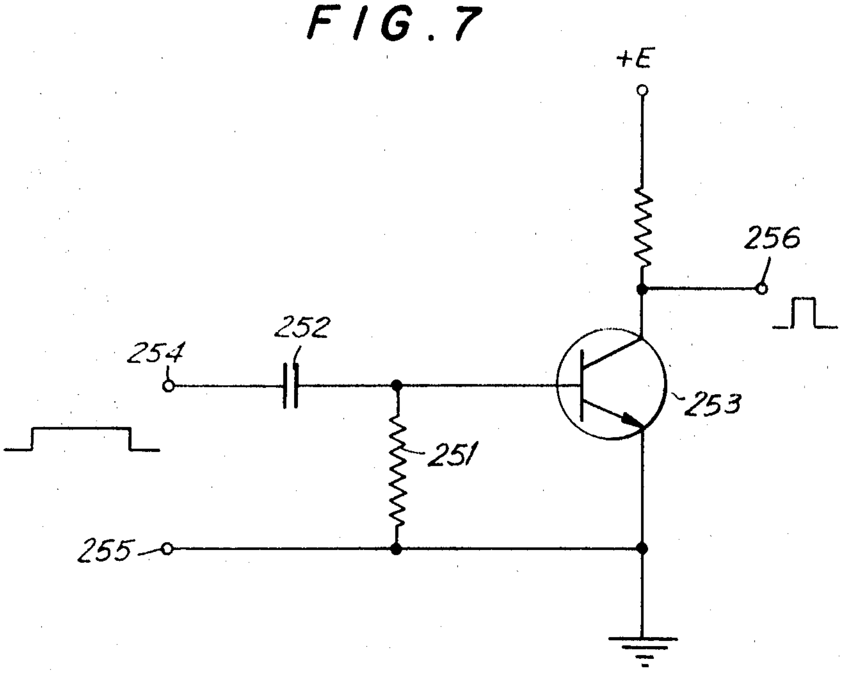

FIG. 6 is a circuit diagram of an embodiment of a bistable multivibrator which may be utilized as the bistable multivibrator 19 of FIGS. 1 and 3; and FIG. 7 is a circuit diagram of the wave sensing circuit 24 of FIG. 1.

In FIG. 1, frequency or phase-modulated binary data signals read out from a storage are supplied to the input of a peak detector 11 via an input terminal 12 and an input lead 13. The output of the peak detector 11 is connected to the input of a first monostable multivibrator 14 via a lead 15 and a lead 16. The output of the peak detector 11 is connected to the input of a second monostable multivibrator 17 via the lead 15 and a lead 18. The output of the peak detector 11 is also connected to two inputs of a bistable multivibrator 19 via the lead 15 and leads 21 and 22.

The output of the monostable multivibrator 14 is connected to an input of the monostable multivibrator 17 via a lead 23 and is also connected to the input of a wave sensing circuit 24 via a lead 25. The output of the second monostable multivibrator 17 is connected to the set input of the bistable multivibrator 19 via a lead 26. Another output of the monostable multivibrator 17 is connected to the reset input of the bistable multivibrator 19 via a lead 27. The set output of the bistable multivibrator 19 is connected to a data signal output terminal 28 via a lead 29. The output of the wave sensing circuit 24 is connected to a clock signal output terminal 31 via a lead 32.

Figure 2:
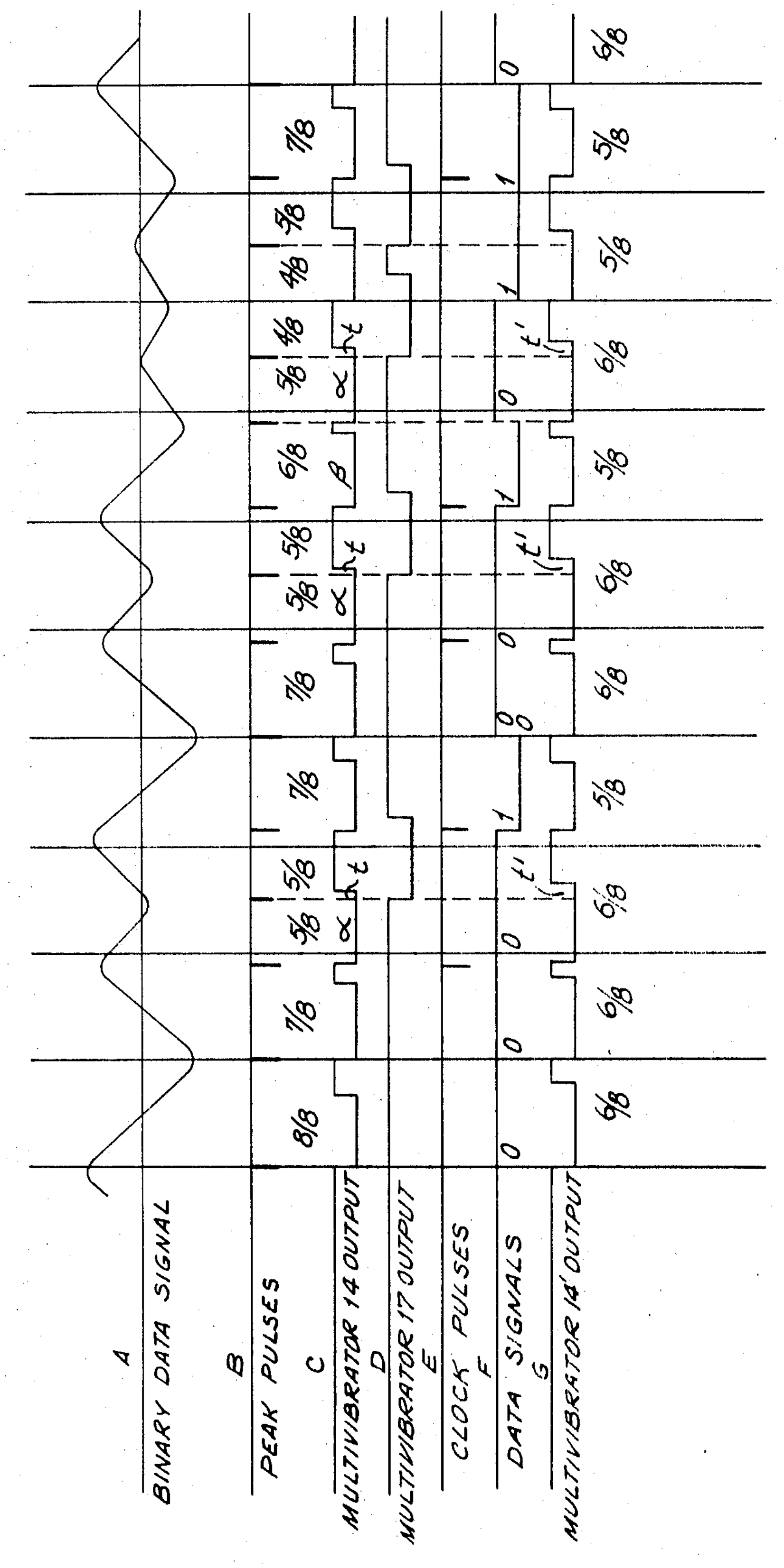
FIG. 2 is a graphical presentation of the waveforms present in the discriminator circuit of the present invention.

A curve having a waveform A, as shown in FIG. 2, appears at the input of the peak detector 11. A curve having the waveform B, as shown in FIG. 2, appears at the output of the peak detector 11. A curve having the waveform C, as shown in FIG. 2, appears in the lead 23 between the first and second monostable multivibrators 14 and 17. A curve having the waveform D, as shown in FIG. 2, appears in the lead 26 to the set input of the bistable multivibrator 19. A curve having the waveform E, as shown in FIG. 2, appears in the output lead 32 and is provided at the output terminal 31. A curve having the waveform F, as shown in FIG. 2, appears in the output lead 29 and is provided at the output terminal 28. A curve having the waveform G, as shown in FIG. 2, appears in the lead 23 between the first and second monostable multivibrators 14' and 17 of FIG. 3.

The binary data signal is provided at the output terminal 28 by the discriminator circuit of the present invention and the clock signals separated from the data signals are provided at the output terminal 31. Each of the monostable multivibrators 14 and 17 functions, in the usual manner of a monostable multivibrator, to produce an operating current for a determined period of time when the monostable multivibrator is supplied with an operating pulse and is otherwise in its stable state. The monostable multivibrator is also known as a "one shot" multivibrator.

The peak detector 11 of FIGS. 1 and 3 may comprise any suitable phase detector circuit. A suitable phase detector circuit is that shown in FIG. 4 and is also that disclosed in U.S. Pat. No. 3,064,243.

The second monostable multivibrator 17 of FIGS. 1 and 3 may comprise any suitable monostable multivibrator circuit. A suitable monostable multivibrator circuit is that shown in FIG. 5.

The bistable multivibrator 19 of FIGS. 1 and 3 may comprise any suitable bistable multivibrator circuit. A suitable bistable multivibrator circuit is that shown in FIG. 6.

The binary data signal supplied to the input terminal 12 is shown in curve A of FIG. 2. As shown, the binary data signal is frequency modulated. Such signal may, of course, be phase-modulated. The frequency modulated signal has a peak point in every bit thereof and may have more than two peak points in two bits thereof depending upon the content or nature of the data or information of such signal. The peaks of the modulated binary data signal are detected by the peak detector 11 and are provided as peak pulses at the output of said peak detector. The peak pulses are shown as curve B of FIG. 2 and are supplied via the lead 15 and the leads 16, 18, 21 and 22 to the monostable multivibrators 14 and 17 and to the bistable multivibrator 19.

The first peak pulse of curve B of FIG. 2 is able to trigger only the first monostable multivibrator 14. The second peak pulse is able to trigger the second monostable multivibrator 17 only when the first monostable multivibrator 14 is already in operation. Thus, if the second peak pulse of the curve B is supplied to the lead 15 while the first monostable multivibrator 14 is in operation, said first monostable multivibrator is not affected by said second peak pulse, but the second monostable multivibrator 17 is operated by said second peak pulse.

Since the data signals are produced between the clock signals, in order to separate the data signals and the clock signals, it is necessary that the operating time of the first monostable multivibrator 14 does not overlap the next succeeding clock signal. The operating time of the first monostable multivibrator 14 may, however, overlap the data signal provided between adjacent clock signals.

If the time of operation of period of astable state of the monostable multivibrator 14 is longer than half the time interval between adjacent clock signals, but shorter than the entire time interval between adjacent clock signals, the pulse indicating the binary value 1 is triggered during the time that said monostable multivibrator is in its astable state. During the time that the monostable multivibrator 14 is in its astable state, a signal representing the binary value 1 is thus provided in the lead 23. The binary 1 signal in the lead 23 is supplied to the monostable multivibrator 17 and the peak pulses are supplied to said monostable multivibrator via the leads 15 and 18, so that said monostable multivibrator is switched to its operative or astable condition. When the monostable multivibrator 17 is in its operative or astable condition, it produces signals representing binary 1 in the lead 26.

The output signal of the first monostable multivibrator 14, which represents the binary data, is illustrated as curve C of FIG. 2. The output signal of the second monostable multivibrator 17, which represents the binary data, is illustrated as curve D of FIG. 2. The output signal D of the second monostable multivibrator 17 is supplied to the set input of the bistable multivibrator 19. The bistable multivibrator 19 is triggered by the peak pulse of the curve B via the leads 15 and 22.

If the bistable multivibrator 19 detects the binary 1 signal D from the output of the monostable multivibrator 17, due to the peak pulse of the curve B supplied via the lead 22, said monostable multivibrator may be in its astable or operative condition long enough to be supplied with the next succeeding peak pulse. Under such circumstances, the bistable multivibrator 19 is switched in condition, from its reset condition to its set condition, by the next succeeding peak pulse of the curve B, and a data signal indicating the binary value 1 is provided in the output lead 29 and the output terminal 28. The binary 1 data signal provided at the output terminal 28 is illustrated as curve F of FIG. 2. The provision of the data signal at the output terminal 28 thus indicates a separation of the data signals from the clock signals.

The clock signals are provided by the wave sensing circuit 24, since they correspond to the rising slope of the output signal, illustrated as curve C of FIG. 2, of the first monostable multivibrator 14. This is due to the fact that the first monostable multivibrator 14 is initiated in operation only by the peak pulse, and the clock pulses or clock signals correspond to the peak pulses shown in curve B. The wave sensing circuit 24 functions to sense the rising slope of the output signal C of the first monostable multivibrator 14. The wave sensing circuit 24 thus provides the clock pulses, shown as curve E of FIG. 2, in the output load 32 and the output terminal 31. The wave sensing circuit 24 may comprise any suitable circuit arrangement for sensing or detecting a rising slope in a waveform supplied to it. The wave sensing circuit 24 is a pulse shortener circuit which is known and the clock signals are thus derived from the pulse shortener circuit in known manner. The monostable multivibrator 14 of FIG. 1 maintains the voltage level of the logic 1 signal for a constant period of time after triggering the voltage level. Therefore, clock signals of short pulse duration cannot be provided without modifying the output waveform of the monostable multivibrator. Pulses of short pulse duration may be provided, however, by supplying signals of long pulse duration to the pulse shortener circuit. These pulses are utilized as clock signals.

FIG. 7 is a circuit diagram of the wave sensing circuit 24 of FIG. 1, which wave sensing circuit is a very well-known differentiation circuit. The wave sensing circuit comprises a resistor 251 and a capacitor 252. The wave sensing circuit further comprises a transistor 253. A first input terminal 254 is connected to the base electrode of the transistor 253 via the capacitor 252. A second input terminal 255 is directly connected to the emitter electrode of the transistor 253, which electrode is connected to the ground. The resistor 251 is connected in parallel with the base-emitter path of the transistor 253. An output terminal 256 is directly connected to the collector electrode of the transistor 253. The transistor 253 functions to compress or shorten the duration of the differentiating waveforms and to amplify such waveforms, as indicated by the waveforms of the input and output illustrated in FIG. 7.

The data or information is included in the binary data signal, illustrated by curve A of FIG. 2, in the time intervals between the peaks represented by the peak pulses, shown as curve B of FIG. 2; that is, there are additional peaks in said time intervals. The additional peaks in the time intervals between the peaks are dependent upon the content of the data or information, so that under ideal conditions the time interval between adjacent peaks is either one or one-half. In binary data signals of the type illustrated by curve A of FIG. 2, the initial waveforms are distorted and the intervals between the peaks are varied and the peaks are shifted from their ideal positions. The variation of each pulse interval is indicated by the numbers in the time intervals between adjacent peak pulses of curve B of FIG. 2. Thus, the first peak pulse interval is 8/8, whereas the second peak pulse interval is 7/8 and the third and fourth peak pulse intervals are each 5/8. The clearly illustrates the irregularity or variation of the time intervals between adjacent peak pulses.

When the initial waveforms are distorted, so that the peak pulse intervals vary, it is difficult to select the operating time or astable state period of the first monostable multivibrator 14 at the optimum value and it is also difficult to adjust such operating time. When the operating time or astable condition period of the first monostable multivibrator 14 is selected as illustrated in curve C of FIG. 2, the effects of the distortion and ensuing variation of the time period between adjacent peak pulses are shown by the points α noted with reference to the curve C of FIG. 2.

The curve C is produced by a monostable multivibrator of any suitable type and is thus subject to the aforementioned discrepancies or irregularities. Under such conditions, it is thus necessary to make the astable time period or time of operation of the first multivibrator 14 as long as possible. On the other hand, however, it is also necessary to make the astable time period or time of operation as short as possible, as indicated by the point β, shown with reference to the curve C of FIG. 2.

In accordance with the present invention, the opposing or contrary requirements for the determination of the astable time period or time of operation of the first monostable multivibrator 14 are satisfied. This is made possible by recognition of the fact that the condition indicated by the point β occurs when the binary 1 signal is detected. Thus, in accordance with the present invention, the astable time period or time of operation of the monostable multivibrator 14 is made as long as possible, and is made short only when the detected clock pulse follows the detected binary 1 signal.

The discriminator circuit of the present invention thus includes a monostable multivibrator 14', as shown in FIG. 3, which is otherwise essentially similar to the discriminator circuit of FIG. 1. The signal produced at the output of the first monostable multivibrator 14' of FIG. 3 is illustrated as curve G of FIG. 2. The output signal G of the monostable multivibrator 14' of the present invention is thus preferable over the output signal C of the monostable multivibrator 14 of known type, and provides the stability in operation and the stability and clarity in the separation of the clock signals and the data signals which are inherent in the discriminator circuit of the present invention.

As illustrated by a comparison of the output curve C of the known type of monostable multivibrator 14 and the output curve G of the monostable multivibrator 14' of the present invention, the astable period or time of operation of the monostable multivibrator 14' is 6/8, which is longer than such time of the monostable multivibrator 14, and such time as 5/8, which is shorter than the time of operation of the monostable multivibrator 14, when the content of the binary data signal is binary 1.

When a known type of monostable multivibrator α is utilized, the signal output C thereof, as shown in curve C of FIG. 2, indicates by the points α that the time margin $t$ is one-sixteenth. When the discriminator circuit of the present invention including the monostable multivibrator 14', as shown in FIG. 3, is utilized, the signal output G thereof, as shown in curve G of FIG. 2, indicates that the time margin $t'$ is twice that of the known monostable multivibrator 14, or one-eighth.

In FIG. 3, which illustrates the discriminator circuit of the present invention, the monostable multivibrator 14' comprises a pair of NPN-type transistors 36 and 37 each having an emitter electrode, a collector electrode and a base electrode. The emitter electrode of each of the transistors 36 and 37 is connected to ground. A positive voltage from a voltage source E is applied to the collector electrode of the first transistor 36 via a collector resistor 38 and to the collector electrode of the second transistor 37 via a collector resistor 39, as well as to the base electrode of the transistor 36 via a base resistor 41. A negative voltage from a voltage source E is applied to the base electrode of the transistor 37 via a base resistor 42.

The base electrode of the transistor 37 is coupled to the collector electrode of the transistor 36 via a parallel resonant circuit 43 which comprises a resistor 44 and a capacitor 45 connected in parallel with each other. The base electrode of the transistor 36 is coupled to the collector electrode of the transistor 37 via a capacitor 46. The lead 16 from the lead 15 is connected via a coupling capacitor 47 and a diode 48 to a common point in the connection between the base electrode of the transistor 36 and the capacitor 46.

The reset output of the bistable multivibrator 19 is connected to a common point in the connection between the base electrode of the transistor 36 and the base resistor 41 via a lead 49 and a resistor 51. The output signal G is derived from a common point in the connection between the collector electrode of the transistor 37 and the capacitor 46 and is connected to the input of the wave sensing circuit 24 via the lead 25 and to an input of the second monostable multivibrator 17 via the lead 23.

The discriminator circuit of FIG. 3 provides a short astable state period or time of operation by changing the charging voltage of the capacitor 46 of the monostable multivibrator 14', when necessary. Thus, when the binary 1 signal is detected, the bistable multivibrator 19 is switched from its reset to its set condition and the binary 1 signal is provided at the output terminal 28. The binary zero signal is provided in the lead 49 and is sufficient to switch the first transistor 36 to its conductive condition.

When the transistor 36 is switched to its conductive condition, the voltage at a circuit point X, which is usually zero, is increased to a determined value such as, for example, +6 volts, by the voltage of the lead 49. The voltage at the circuit point X thus restricts the charging voltage of the capacitor 46 to a magnitude lower than that of the usual charging voltage. This limits the astable state period or time of operation of the monostable multivibrator 14' to a duration which is shorter than usual.

Although in the foregoing description, the operating time of the monostable multivibrator 14' is changed when a binary 1 signal is detected, it is, of course, possible to change such operating time when a binary zero signal is detected.

In each of FIGS. 1 and 3 each of the output terminals 28 and 31 is connected to a corresponding register. Each register is of any suitable known type.

Figure 4:
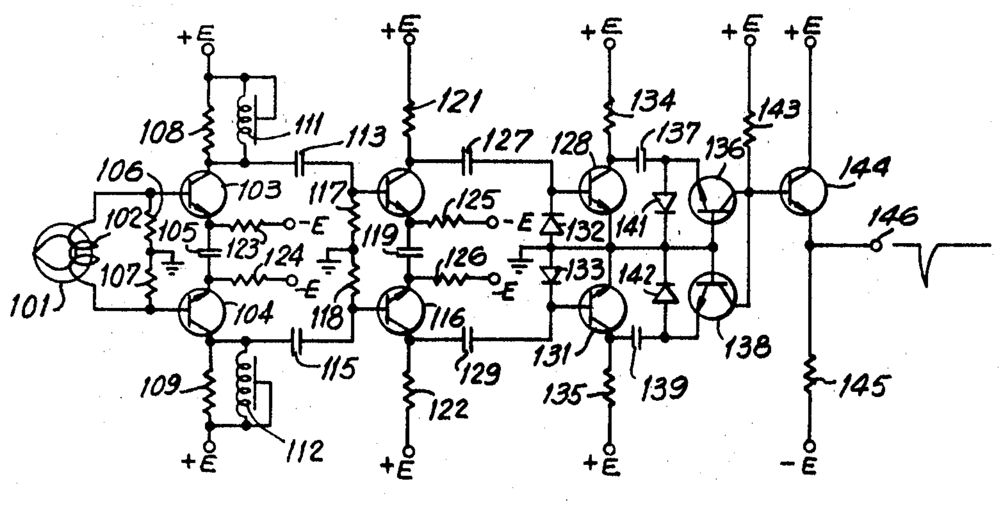
FIG. 4 is a circuit diagram of an embodiment of a peak detector which may be utilized as the peak detector 11 of FIGS. 1 and 3.

In the peak detector of FIG. 4, a pickup head 101 has a winding 102, one end of which is connected to the base electrode of a transistor 103 and the other end of which is connected to the base electrode of a transistor 104. The emitter electrodes of the transistors 103 and 104 are coupled to each other via a capacitor 105. A pair of resistors 106 and 107 are connected in series circuit arrangement between the base electrodes of the transistors 103 and 104. A common point in the connection between the resistors 106 and 107 is connected to a point at ground potential.

A positive voltage is applied to the collector electrode of the transistor 103 via a resistor 108 and a positive voltage is applied to the collector electrode of the transistor 104 via a resistor 109. An inductance 111 is connected in parallel with the resistor 108. An inductance 112 is connected in parallel with the resistor 109. The first stage of the peak detector is coupled to the second stage of said peak detector via a coupling capacitor 113, which is connected between the collector electrode of the transistor 103 and the base electrode of a transistor 114, and a coupling capacitor 115, which is connected between the collector electrode of the transistor 104 and the base electrode of a transistor 116.

A pair of resistors 117 and 118 are connected in series circuit arrangement between the base electrodes of the transistors 114 and 116. A common point in the connection between the resistors 117 and 118 is connected to a point at ground potential. The emitter electrodes of the transistors 114 and 116 are coupled to each other via a capacitor 119. A positive voltage is applied to the collector electrode of the transistor 114 via a resistor 121. A positive voltage is applied to the collector electrode of the transistor 116 via a resistor 122.

In the first stage of the peak detector, a negative voltage is applied to the emitter electrode of the transistor 103 via a resistor 123 and a negative voltage is applied to the emitter electrode of the transistor 104 via a resistor 124. In the second stage of the peak detector, a negative voltage is applied to the emitter electrode of the transistor 114 via a resistor 125 and a negative voltage is applied to the emitter electrode of the transistor 116 via a resistor 126.

The second stage of the peak detector of FIG. 4 is coupled to the output stage via a coupling capacitor 127, which is connected between the collector electrode of the transistor 114 and the base electrode of a transistor 128, and a coupling capacitor 129, which is connected between the collector electrode of the transistor 116 and the base electrode of a transistor 131. A pair of diodes 132 and 133 are connected in series circuit arrangement with opposite polarities between the base electrodes of the transistors 128 and 131. A common point in the connection between the diodes 132 and 133 is connected to a point at ground potential. A common point in the connection between the emitter electrodes of the transistors 128 and 131 is also connected to a point at ground potential. A positive voltage is applied to the collector electrode of the transistor 128 via a resistor 134 and a positive voltage is applied to the collector electrode of the transistor 131 via a resistor 135.

The collector electrode of the transistor 128 is coupled to the emitter electrode of a transistor 136 via a coupling capacitor 137. The collector electrode of the transistor 131 is coupled to the emitter electrode of a transistor 138 via a coupling capacitor 139. A pair of diodes 141 and 142 are connected in series circuit arrangement with opposite polarities between the emitter electrodes of the transistors 136 and 138. The base electrodes of the transistors 136 and 138 are connected in common with each other. A common point in the connection of the diodes 141 and 142 is connected to a point at ground potential, as is a common point in the connection of the base electrodes of the transistors 136 and 138.

The polarities of the diodes 132 and 133 are opposite those of the diodes 141 and 142. Thus, the anodes of the diodes 132 and 133 are connected in common with each other and the cathodes of the diodes 141 and 142 are connected in common with each other. A positive voltage is applied to the collector electrode of each of the transistors 136 and 138 via a resistor 143. The collector electrode of the transistors 136 and 138 are connected in common to the base electrode of an output transistor 144.

A positive voltage is directly applied to the collector electrode of the output transistor 144. A negative voltage is applied to the emitter electrode of the transistor 144 via a resistor 145. The output pulse produced by the peak detector is provided at an output terminal 146 connected to the emitter electrode of the output transistor 144.

Figure 5:
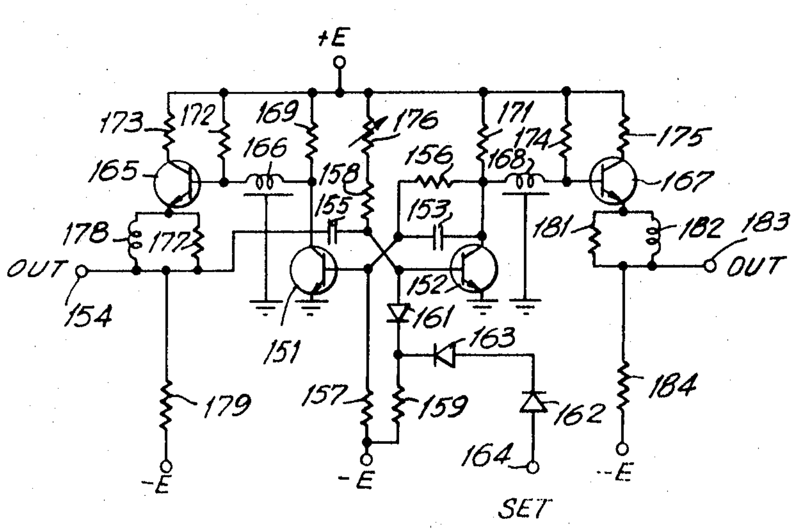
FIG. 5 is a circuit diagram of an embodiment of a monostable multivibrator which may be utilized as the monostable multivibrator 17 of FIGS. 1 and 3.

In the monostable multivibrator of FIG. 5, the base electrode of a transistor 151 is coupled to the emitter electrode of a transistor 152 via a capacitor 153. The base electrode of the transistor 152 is coupled to an output terminal 154 via a capacitor 155. A resistor 156 is connected in parallel with the capacitor 153. The emitter electrode of each of the transistors 151 and 152 is connected to a point at ground potential.

A negative voltage is applied in common to the base electrode of the transistor 151 and to the parallel resonant circuit 153, 156 via a resistor 157. The same negative voltage is applied in common to the base electrode of the transistor 152 and a common point in the connection between the capacitor 155 and a resistor 158 via a resistor 159 and a diode 161 connected in series circuit arrangement with the resistor 159. A set input is supplied to the base electrode of the transistor 152 via a pair of diodes 162 and 163 connected in series circuit arrangement between a set input terminal 164 and a common point in the connection between the resistor 159 and the diode 161.

The collector electrode of the transistor 151 is coupled to the base electrode of a transistor 165 via an inductance 166. The collector electrode of the transistor 152 is coupled to the base electrode of a transistor 167 via an inductance 168. The parallel resonant circuit 153, 156 is also coupled to the base electrode of the transistor 167 via the inductance 168. A positive voltage is applied to the collector electrode of the transistor 151 via a resistor 169, to the collector electrode of the transistor 152 via a resistor 171, to the base electrode of the transistor 165 via a resistor 172, to the collector electrode of the transistor 165 via a resistor 173, to the base electrode of the transistor 167 via a resistor 174 and to the collector electrode of the transistor 167 via a resistor 175.

A variable resistor 176 is connected in series circuit arrangement with the resistor 158 and the capacitor 155 between the output terminal 154 and the source of positive voltage. A common point in the connection between the capacitor 155 and the resistor 158 is connected in common to the base electrode of the transistor 152 and the anode of the diode 161. A resistor 177 is connected in parallel with an inductor 178 to the emitter electrode of the transistor 165. The resistor 177 and the inductor 178 function as a parallel resonant circuit. The parallel resonant circuit 177, 178 is connected between the emitter electrode of the transistor 165 and the output terminal 154 and between said emitter electrode and a source of negative voltage via a resistor 179.

A resistor 181 is connected in parallel with an inductor 182 and functions with said inductor as a parallel resonant circuit. The parallel resonant circuit 181, 182 is connected between the emitter electrode of the transistor 167 and an output electrode 183 and between said emitter electrode and a source of negative voltage via a resistor 184.

In the bistable multivibrator of FIG. 6, the collector electrode of a transistor 191 is coupled to the base electrode of a transistor 192 via a capacitor 193. The collector electrode of the transistor 192 is coupled to the base electrode of the transistor 191 via a capacitor 194. A resistor 195 is connected in parallel with the capacitor 193 and functions therewith as a parallel resonant circuit. A resistor 196 is connected in parallel with the capacitor 194 and functions therewith as a parallel resonant circuit. The emitter electrodes of the transistors 191 and 192 are connected to a point at ground potential. A positive voltage is applied to the collector electrode of the transistor 191 via a resistor 197 and a positive voltage is applied to the collector electrode of the transistor 192 via a resistor 198.

A negative voltage is applied in common to the base electrode of the transistor 191 and to the parallel resonant circuit 194, 196 via a resistor 199 and via a resistor 201 and a diode 202 connected in series circuit arrangement. A negative potential is applied in common to the base electrode of the transistor 192 and to the parallel resonant circuit 193, 195 via a resistor 203 and a resistor 204 and a diode 205 connected in series circuit arrangement. A set input is supplied via set input terminals 206 and 207. A reset input is supplied via reset input terminals 208 and 209. The set input terminal 206 is coupled to a common point in the connection between the resistor 201 and the diode 202 via a diode 211 and a diode 212 connected in series circuit arrangement. The set input 207 is coupled to a common point in the connection between the resistor 201 and the diode 202 via a diode 213 connected in series circuit arrangement with the diode 212. The reset input terminal 208 is coupled to a common point in the connection between the resistor 204 and the diode 205 via a diode 214 and a diode 215 connected in series circuit arrangement. The reset input terminal 209 is coupled to a common point in the connection between the resistor 204 and the diode 205 via a diode 216 connected in series circuit arrangement with the diode 215. The diodes 202 and 205 are connected with a polarity opposite that of the diodes 211 to 216.

The collector electrode of the transistor 191 and the parallel resonant circuit 193, 195 are coupled in common to the base electrode of a transistor 217 via an inductance 218. The collector electrode of the transistor 192 and the parallel resonant circuit 194, 196 are coupled in common to the base electrode of a transistor 219 via an inductance 221. A positive voltage is applied to the collector electrode of the transistor 217 via a resistor 222, to the base electrode of the transistor 217 via a resistor 223, to the collector electrode of the transistor 219 via a resistor 224 and to the base electrode of the transistor 219 via a resistor 225. A resistor 226 is connected in parallel with an inductor 227 and functions therewith as a parallel resonant circuit. A resistor 228 is connected in parallel with an inductor 229 and functions therewith as a parallel resonant circuit. The parallel resonant circuit 226, 227 is connected between the emitter electrode of the transistor 217 and an output terminal 231 and between said emitter electrode and a source of negative voltage via a resistor 232. The parallel resonant circuit 228, 229 is connected between the emitter electrode of the transistor 219 and an output electrode 233 and between said emitter electrode and a source of negative voltage via a resistor 234.

While the invention has been described by means of a specific example and in a specific embodiment, I do not wish to be limited thereto, for obvious modifications will occur to those skilled in the art without departing from the spirit and scope of the invention.

I claim:

1. A discriminator circuit for detecting and separating binary data signals and clock signals from a modulated binary data signal, said discriminator circuit comprising:

peak detector means for deriving peak pulses from said modulated binary data signal, said peak pulses being separated by time intervals subject to variation;

data deriving means for detecting and separating binary data signals from said modulated binary data signal;

clock deriving means for detecting and separating clock signals from said modulated binary data signal; and control means connected between said peak detector means and each of said data deriving means and said clock deriving means and operable by the peak pulses derived by said peak detector means to control the operation of each of said data deriving and clock deriving means, said control means comprising time varying means for varying the time positions of said clock signals to overcome variations in the time intervals between said peak pulses.

2. A discriminator circuit as claimed in claim 1, wherein said data deriving means is connected to said control means for varying the time positions of said clock signals in accordance with the nature of the binary data of said binary data signals.

3. A discriminator circuit as claimed in claim 1, wherein said control means comprises a monostable multivibrator.

4. A discriminator circuit as claimed in claim 2, wherein said control means comprises a monostable multivibrator.

5. A discriminator circuit as claimed in claim 2, wherein said control means comprises a monostable multivibrator having an operating time during its period of astable operation and time varying means for varying the operating time thereof to vary the time positions of said clock signals in accordance with the nature of the binary data of said binary data signals.

6. A discriminator circuit as claimed in claim 5, wherein the time varying means of said monostable multivibrator shortens the operating time thereof when a determined binary value is indicated in said data deriving means.

7. A method of detecting and separating binary data signals and clock signals from a modulated binary data signal, comprising the steps of:

deriving peak pulses from said modulated binary data signal, said peak pulses being separated by time intervals subject to variation;

detecting and separating binary data signals from said modulated binary data signal;

detecting and separating clock signals from said modulated binary data signal; and controlling the detecting and separating of each of said binary data signals and clock signals to vary the time positions of the clock signals to overcome variations in the time intervals between said peak pulses.

8. A method of detecting and separating binary data signals and clock signals from a modulated binary data signal as claimed in claim 7, wherein the time positions of said clock signals are varied in accordance with the nature of the binary data of said binary data signals.